R. ESNAULT-PELTERIE.
INTERNAL COMBUSTION TURBINE ENGINE.
APPLICATION FILED DEC. 28, 1917.
1,312,899. Patented Aug. 12, 1919.
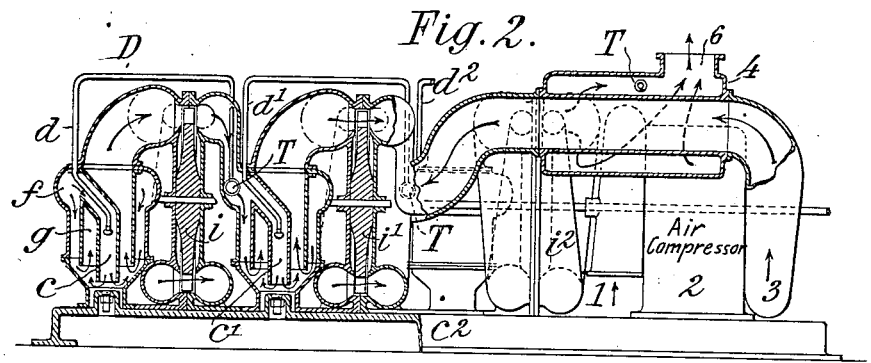
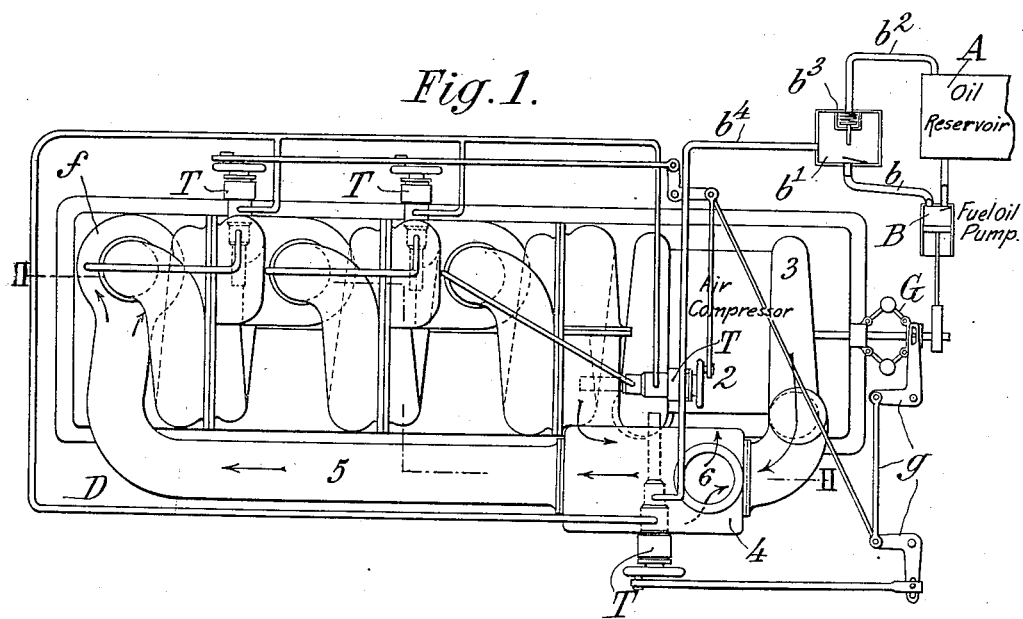
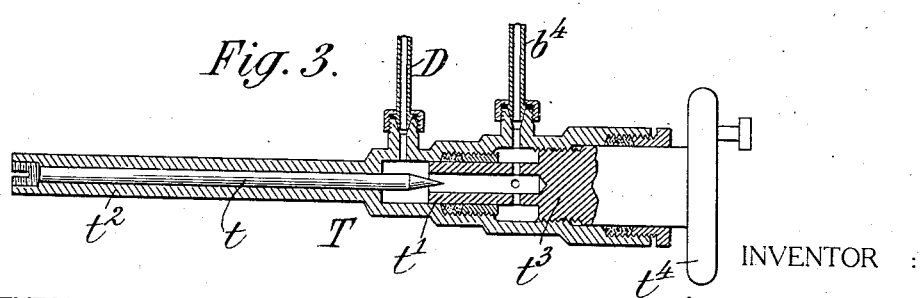
WITNESSES: INVENTOR:
Robert Esnault-Pelterie
By Attorneys,

ABSTRACT# UNITED STATES PATENT OFFICE.

ROBERT ESNAULT-PELTERIE, OF BOULOGNE-SUR-SEINE, FRANCE.

INTERNAL-COMBUSTION TURBINE-ENGINE.

1,312,899. Specification of Letters Patent. Patented Aug. 12, 1919.

Application filed December 28, 1917. Serial No. 209,363.

*To all whom it may concern:*

Be it known that I, ROBERT ESNAULT-PELTERIE, a citizen of the Republic of France, residing in Boulogne-sur-Seine, Seine, France, have invented certain new and useful Improvements in Internal-Combustion Turbine-Engines, of which the following is a specification.

The present application is in part a division of my application Serial No. 38,640, filed July 8, 1915, now Patent No. 1,278,499.

The present invention provides means whereby engines may be operated under such conditions of control that the turbine blades will not become burned by excessive heat of the gases, and under such conditions that dangerous and injurious speed of the rotor will not be developed.

The invention further comprises the combination and arrangement of parts hereinafter more particularly described.

In Figure 1 of the drawings is shown, in top plan view, an internal combustion turbine engine according to my aforesaid application Serial No. 38,640, and including the regulating means therefor.

Fig. 2 is a vertical sectional view on the line II—II Fig. 1.

Fig. 3 is a longitudinal sectional view of a thermal regulator of my invention.

The turbine engine will be briefly described: Referring to Figs. 1 and 2, atmospheric air is drawn in at 1. It is compressed in a compressor 2 and passes therefrom at 3 to be heated in a temperature exchanger 4. From the temperature exchanger it goes by way of pipe 5 to the space $f$ in the first combustion chamber $c$. Air is partially carbureted in the combustion chamber $c$ by fuel (gasolene, for example) coming from the supply pipe D. The mixture in the combustion chamber $c$ is ignited, which heated mixture passes out of the combustion chamber $c$ into the passage $g$, mixing with the mass of air flowing from $f$ into $g$. The heated air mixture flowing through the pipe $g$ expands against the first turbine wheel $i$, there loses heat in consequence of the expansion, and is then re-heated by a second combustion of fuel in the second combustion chamber $c'$, in a manner similar to the combustion in the chamber $c$, the air mixture entering the chamber $c'$, containing a sufficient excess of oxygen for uniting with the fuel introduced into $c'$. The re-heated air mixture flowing through $g'$ expands against the second turbine wheel $i'$, and again loses heat. The air (or rather the air containing the products of combustion) is again re-heated by a third combustion of fuel therein in the third combustion chamber $c^2$ and expands against the third wheel $i^2$, and the air and combustion products mixture finally gives up its calories in the temperature exchanger 4 before passing out into the atmosphere at 6.

The combustion, therefore, in the example just referred to, takes place at three times or stages, the oil fuel being injected through pipes $d$ $d'$ $d^2$ in such manner that each of the wheels $i$ $i'$ $i^2$ is under identical conditions of temperature. These successive combustions are advantageous because they permit of having the maximum suitable temperature at all of the turbine wheels $i$ $i'$ $i^2$, and there is the capability of a large excess of air being used as regards the fuel injected.

Liquid fuel is supplied to the pipe D from a reservoir A by means of a feed pump B, the oil passing through a pipe $b$, to a chamber $b'$ having a return pipe $b^2$ to the oil reservoir A and a back-pressure return valve $b^3$ therein, the oil passing from the chamber $b'$ through a pipe $b^4$ and a thermal regulator T (hereinafter being more fully described) to the pipe D.

It is apparent from investigation by the applicant that if in such a turbine the feed or delivery of the combustible fuel be controlled by a pump having a regulated discharge (as herein shown), and if the machine governor or regulator has once acted on the delivery, this latter becoming constant for the number of turns, there is produced as soon as the number of turns varies, reciprocal variations in the air delivery from which results a considerable variation in the temperature of the gases after expansion. This is equivalent to saying that with such regulation, the least variation in the angular speed is able to produce an increase of heat which places instantly out of use the expansion nozzles, and more especially the blades of the turbine wheel.

To prevent this inconvenience, which renders the machine useless, the applicant disposes in the pipe conducting combustible fuel to the explosion chamber, as the pipe D, the thermal needle valve T, which is arranged in such manner that it is closed as soon as the temperature at the outlet of the turbine blades increases, and opens again as soon as the said temperature declines, thus constituting an automatic regulation to a constant temperature of the gases after expansion, the regulation automatically protecting the turbine rotor against damage by heat.

The device T for throttling the admission of the combustible fuel when the temperature of the exhaust from the turbine increases in an abnormal manner, consists of a pointed needle $t$ whose obturating point and the seat $t'$ coöperating therewith, are parts respectively of a rod and a concentric tube, and are formed of two metals having co-efficients of expansion as different as possible, the direction of the point naturally being such that when the temperature is raised it tends to close the orifice through the seat $t'$, and when the temperature drops it tends to open more widely the said orifice.

By way of example, the metals which give good results may be red copper, whose co-efficient of expansion is 0.00001607, or a low percentage nickel steel having twenty per cent (20 %) of nickel, whose coefficient of expansion is still higher, the other metal being preferably of steel nickel with about thirty-five per cent. (35%) of nickel or Invar steel, whose coefficient of expansion is of the order 0.0000025.

The rod $t$ in Fig. 3 is made of highly expansive metal, and is housed in the tube $t^2$ formed of less expansive metal, so that when the rod $t$, through heating, becomes longer than the tube $t^2$, its pointed extremity obturates the orifice in the seat $t'$ and opposes the passage of combustible fuel, which arrives through the tube $b^4$ and goes out by way of the tube D to be consumed in the combustion chambers of the engine. To regulate the temperature at which the throttling of the orifice in the seat $t'$ by the needle $t$ occurs, the tube $t'$ is made adjustable and carried by a threaded nut $t^3$ having means thereon for turning it, as a hand wheel $t^4$.

The nut $t^3$ is provided with the necessary packing glands for preventing the leakage of the liquid combustible fuel.

According to the adjustment of the said nut $t^3$, the complete obturation of the opening in the part $t'$ will result at a predetermined temperature, and the system will itself always tend to maintain the exhaust gases at this same temperature at the outlet of the engine.

The nut $t^3$ carrying the tube $t'$ may be either controlled by hand or associated with the machine governor, since it suffices to increase the delivery to accelerate the machine and to diminish it to slow the machine down. It may be advantageous to adapt it to be controlled by both means, by the agency of a compensating lever, a differential, or any equivalent device. The only precaution to be taken is, of course, to arrange that the delivery of combustible fuel cannot exceed the maximum limit at which the temperature attains the limiting value which the turbine blades can stand. As here shown, the regulator T is connected with the governor G through a series of links and levers $g$, and is also provided with a hand wheel $t^4$. The nut $t^3$ may therefore be operated by the governor to modify the amount of opening through the orifice in the seat $t'$, in accordance with the speed of the engine.

When the orifice through the regulator T is obturated, the back-pressure in the chamber $b'$ will cause the fuel delivered by the pump B to return to the oil reservoir through the return pipe $b^2$, the back-pressure valve $b^3$ opening at a predetermined pressure.

It is also possible to effect the regulation by placing in the exhaust of the engine an obturating device analogous to the preceding, but formed in a manner to be very sensitive (for example, by increasing the number of pairs of metals which can be placed concentrically one within another similarly to the straight arm pendulum compensators, or unequally expanding metals) and to cut off the combustible fuel more or less completely as soon as the temperature attains an inadmissible value, the regulation being effected by another throttling controlled by the governor or regulator placed at another point of the combustible fuel inlet 2.

The inventive ideas may receive other mechanical embodiments than that herein illustrated and specifically described.

What I claim is:—

1. An internal combustion turbine engine, comprising an air compressor driven by said engine, a combustion device supplied with air in excess from said compressor and having a fuel injecting means therein, a turbine driven by the hot gases from said combustion device, and a thermal regulator located in the path of the exhaust gases from said turbine controlling the supply of liquid fuel to said injecting means.

2. An internal combustion turbine engine, comprising an air compressor driven by said engine, a combustion device supplied with air in excess from said compressor and having a fuel injecting means therein, a turbine driven by the hot gases from said combustion device, a thermal regulator located in the path of the exhaust gases from said turbine controlling the supply of liquid fuel to said injecting means, and a speed-controlled device also acting upon said thermal regulator to control the supply of liquid fuel.

3. An internal combustion turbine engine, comprising an air compressor driven by said engine, a plurality of combustion devices, said combustion devices being connected in series with said air compressor, the air being introduced in considerable excess in the first combustion device, and being capable of supporting combustion of additional quantities of fuel introduced into the exhaust from a preceding combustion device, a fuel injector in each combustion device, a plurality of turbines driven by the hot gases from said combustion devices and a thermal regulator in the exhaust gases of each disk for controlling the supply of liquid fuel to said injecting means.

4. A process of converting fuel energy into mechanical work comprising combusting a combustible fuel and a combustion supporting gas, the resulting gas containing sufficient quantities of combustion supporting gas to support further combustion, directing a jet of compressed gas against the rotor of a turbine, the gas being allowed but a small degree of expansion in passing through the turbine, consequently undergoing but a slight loss in temperature, combusting a further quantity of fuel in the partially cooled gas to restore the loss in temperature, again allowing gas to expand slightly to perform work, repeating the combustion of further quantities of fuel and slight expansion of the gas, and controlling for each combustion the supply of combustible fuel by thermal means.

5. A process of converting fuel energy into mechanical work comprising combusting a combustible fuel and a combustion supporting gas, the resulting gas containing sufficient quantities of combustion supporting gas to support further combustion, directing a jet of compressed gas against the rotor of a turbine, the gas being allowed but a small degree of expansion in passing through the turbine, consequently undergoing but a slight loss in temperature, combusting a further quantity of fuel in the partially cooled gas to restore the loss in temperature, again allowing gas to expand slightly to perform work, repeating the combustion of further quantities of fuel and slight expansion of the gas, and controlling for each combustion the amount of fuel supplied to the gaseous mixture by the temperature of the exhaust gases.

In witness whereof I have hereunto signed my name in the presence of two subscribing witnesses.

ROBERT ESNAULT-PELTERIE.

Witnesses:
CHAS. P. PRESSLY,
HENRI CARTIER.